Patented Apr. 19, 1949

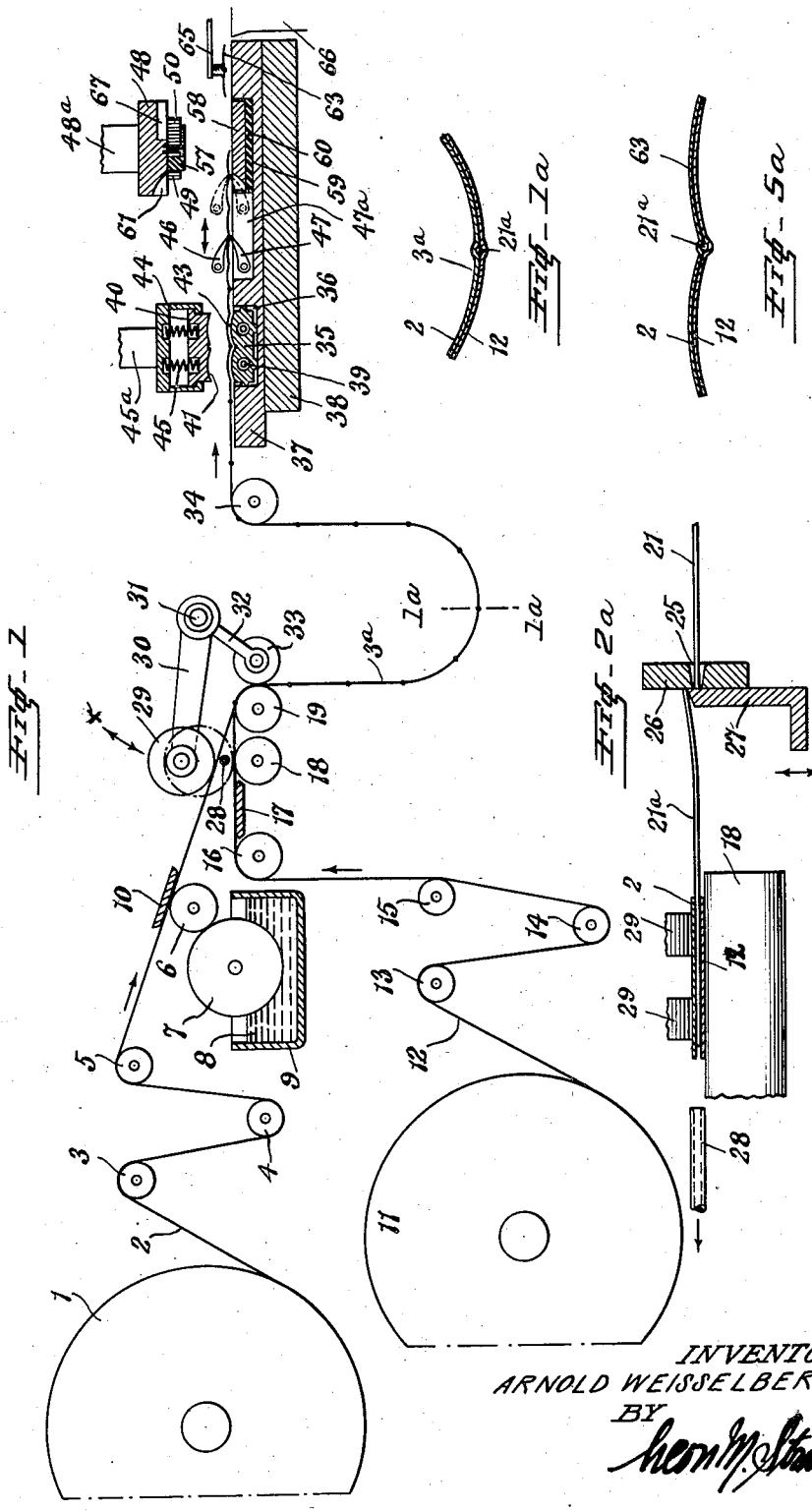

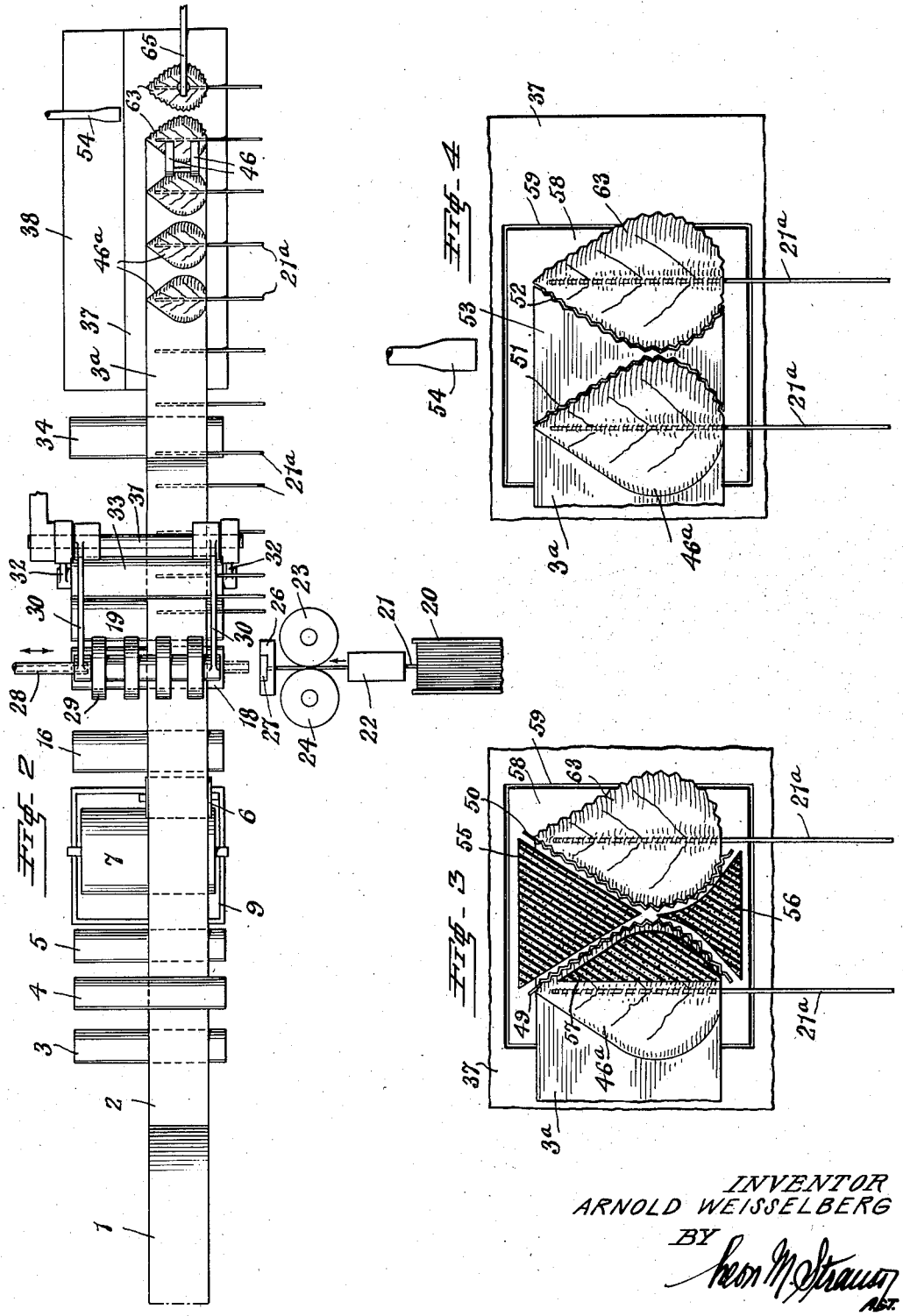

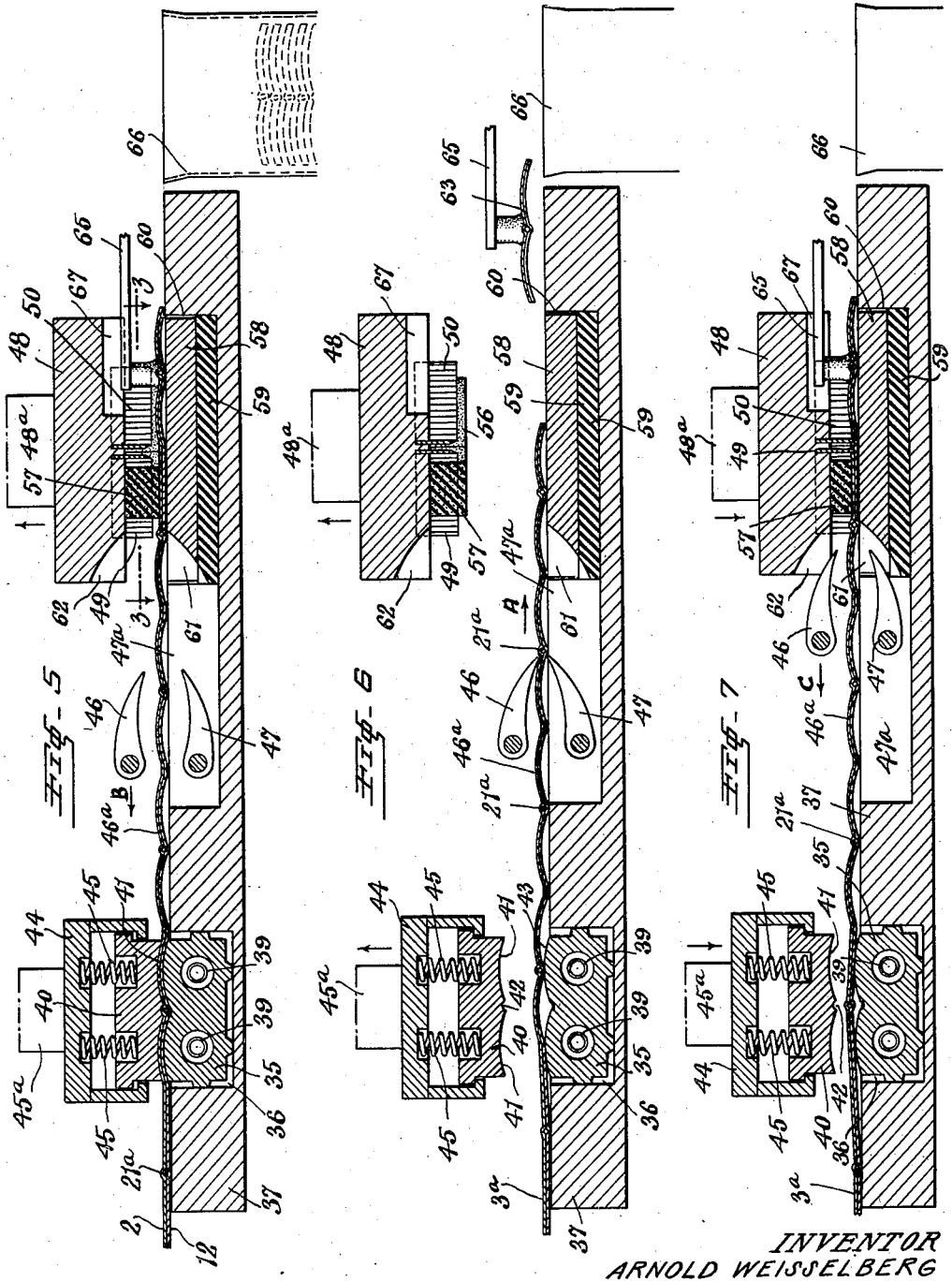

2,467,572

UNITED STATES PATENT OFFICE 2,467,572

METHOD AND MEANS FOR PRODUCING ARTIFICIAL FLOWER LEAVES

Arnold Weisselberg, New York, N. Y., assignor, by mesne assignments, to The Leaf Manufacturing Corporation, New York, N. Y., a corporation of New York Application February 8, 1946, Serial No. 646,274

7 Claims. (Cl. 154—75)

This invention relates to method and means for producing artificial flower or plant leaves and similar articles.

It is an important object of the invention to provide means for uniting either a plurality of flexible tapes or lengthy strips or plies of suitable base material together from which leaf representations or similar articles are subsequently obtained, which articles are designed to carry between said strips or plies stiffening means in spaced apart relation which means serve to form stems or like accessories for the leaves thus produced.

It is another object of the invention to provide means facilitating the embossing of said base material to produce shape and to simulate other structural characteristics of natural leaves, before the leaves are cut or removed from the base material.

It is still another object of the invention to provide means permitting continuous cutting or stamping operations with respect to said base material, whereby artificial flower leaves or similar articles are manufactured in a very efficient and economical manner and at relatively high speed and with a minimum of waste.

More particularly, the invention contemplates the provision of means by which one or more strips forming the base material are supplied in the same direction and in superposed relation with elements or wire pieces anchored in said base material and fed in spaced intervals.

Another aspect of the invention is the provision of further means making feasible the assembly of said strips in laminated fashion or layer formation whereby the wire pieces are retained therein in spaced relation with portions of said wire pieces projecting beyond said base material, of other means aiding in continuously delivering the laminated strip of base material thus formed to suitable embossing elements between which leaf representations and the like are surfaced to simulate structural characteristics of natural leaves; and of cutting means by which the leaves are severed from said base material for subsequent collection in a receptacle.

Still a further object of this invention resides in the provision of means affording the supply of different widths of base material and the production therefrom of artificial flower or plant leaves having varying predetermined lengths and shapes.

Yet, another aspect of this invention is to provide means rendering continuous manufacturing steps possible for attaining artificial flower leaves or similar articles, the removal thereof from a lengthy strip of base material being caused while the latter is subjected at a remote location to an embossing operation.

These and other objects are attained according to this invention, a more particular description of which will be hereinafter set forth and pointed out in the claims appended hereto.

In the drawings:

Fig. 1 is a diagrammatic view of the machine embodying the invention, parts being shown in section;

Fig. 1a is a sectional view taken along line 1a—1a of Fig. 1;

Fig. 2 is a top plan view of the machine, seen in Fig. 1;

Fig. 2a is a sectional view through the cutting means for the wire stems;

Fig. 3 is a sectional view through the leaf cutting elements; the view being taken along line 3—3 of Fig. 5, looking in the direction of the arrows;

Fig. 4 is a top plan view of the base against which the cutting element or knife operates, showing one of the leaves completely severed from the strip and one side edge of a second leaf cut by the knife;

Fig. 5 is a vertical sectional view through the embossing means, the feeding mechanism and the cutting elements, showing a leaf in the process of being embossed in the strip and a cut-out leaf engaged by the suction picker preparatory to being raised and caried away;

Fig. 5a is a transverse sectional view through one of the formed and cut-out leaves;

Fig. 6 is a sectional view similar to that of Fig. 5, but showing the feeding mechanism in the act of moving the strip from the embossing means to the cutting elements;

Fig. 7 is another view of the machine parts of Figs. 5 and 6, showing the cutting elements severing a leaf from the strip and the embossing means in the act of descending to emboss a leaf representation in the strip.

Referring now in greater detail to Fig. 1 of the drawings, numeral 1 indicates a roll of suitable sheet material in tape or lengthy strip form. The material may be cloth or other relatively tough and preferably cellulosic, flexible substance. The strip 2 fed from the roll 1 extends about guide rollers 3, 4 and 5 and then passes over an adhesive applying roller 6, which receives a layer of a plastic, thermoplastic or similar adhesive or suitable glue from supply roller 7 rotating in said adhesive 8 contained in receptacle 9. The strip 2 moves under a guide bar 10 by means of which it is maintained in contact with roller 6 to thereby receive upon the underface of said strip a uniform coating of adhesive.

At 11 there is shown a roll of sheet material in tape or strip form, said sheet material being paper or other cellulosic material from which the strip 12 is drawn to pass over guide rollers 13, 14 and 15 and thence leads over a roller 16, a guide plate 17 and subsequently over rollers 18 and 19.

Operative above the roller 18 is a wire feeding mechanism, diagrammatically shown in Figs. 2 and 2a. The supply of thin wire that is achieved by said mechanism comes from a reel 20 (Fig. 2). The wire 21 drawn from said reel 20 is first pulled through a known straightening device 22 by means of feed rollers 23 and 24 and is then fed through an aperture 25 (Fig. 2a) in a guide block 26 with which a shearing knife 27 cooperates to cut off uniformly-sized lengths of wire to be delivered between the strips 2 and 12 so that when said strips are adhesively united into a two-layer web, a predetermined length of wire piece will be held between them. The shearing knife 27 is vertically reciprocated, as shown in Fig. 2a, in properly timed relation to the wire feeding mechanism, as will be clearly understood, so that when a wire length has been interposed between the two strips 2 and 12 and has a part of the proper length projecting therefrom, as in Fig. 2a, and the portion of the wire located between the strips is clamped between rollers 18 and 29, the knife 27 will become operative to sever a length, indicated at 21a, from the wire 21.

At 28 is shown a wire guide tube which serves to guide the wire 21 between the strips 2 and 12 at a point directly above the roller 18, as seen in Fig. 1. In its inoperative position, the guide tube 28 is located at the extreme left in Fig. 2a and thus is beyond the strips 2 and 12 which are being pressed together and adhesively united by the pressure imposed upon them between the under roller 18 and the upper divided roller 29 in Figs. 1 and 2. By suitable means, not shown, the wire-guiding tube 28 is moved in a direction toward the shearing or cutting blade 27 so that when the wire 21 is fed through aperture 25, while the shearing knife 27 is in a lowered position, the wire will be guided through the tube 28 and will enter between the strips 2 and 12 to the proper length. Then roller 29 is lowered as indicated in dotted lines in Fig. 1, to press the strips 2 and 12 together and hold the wire in place. While the wire is so fixed a piece of it of the proper length is then sheared off as shown in Fig. 2a, tube 28 having been withdrawn to the position shown in Fig. 2a.

It will be noted that the roller 29 is carried by arm 30 secured on a rock shaft 31, said shaft 31 also carrying downwardly dependent arm 32 in which a pressing roller 33 is rotatively mounted, the latter roller operating to press the laminated or layered strip with the wires 21a in place between its layers, between it and the roller 19. Shaft 31 is arranged to be moved with a rocking movement in properly timed relationship to the wire guide-tube device previously described, whereby the roller 29 is held in an elevated position, as shown in full lines in Fig. 1, while the wire-guide tube is located between it and the lower roller 18. When the tube 28 reaches its position seen in full lines in Figs. 2 and 2a, and is clear of the upper roller 29, shaft 31 is actuated (by driving means, not shown) and rocked to bring the roller 29 down upon the laminated strips 2 and 12 and the interposed wire piece 21a to thereby press the strips and wire together. While this pressing operation is taking place between the rollers 29 and 18, the wire is cut off as above described, and roller 33 is swung away from roller 19 (see arrow x).

From between the rollers 19 and 33, the two-layered web indicated by numeral 3a, now consisting of the two united strips 2 and 12, with the wire pieces 21a interposed between them and in uniformly spaced relation, extends in a slack loop, as shown in Fig. 1 and is then carried over a guide roller 34 to reach the embossing dies.

The embossing dies include a lower die member 35 which is mounted in a recess 36 in a base plate 37 supported on a suitable table 38 or other rigid supporting means. Said lower die member may be suitably heated by electric heating coils as indicated at 39. The upper die member is shown at 40 and it has its under face double-concaved as at 41 and centrally grooved at 42, the groove 42 being provided to clear the wire 21a forming the axial center line of the simulated leaf to be embossed. Both the under face of the upper die 40 and the complementary top face of the lower die 35 may be formed with the irregularities or reproductions of veins of a natural leaf to thereby impress these irregularities and vein simulations in the laminated strip fed between them. The upper die 40 is resiliently mounted in a housing 44 containing the coil springs 45 operative against the die member 40 and affording a resilient mounting for it. Extending from the housing 44 is a vertical shaft 45a which is vertically reciprocable in suitable guiding means and in properly timed relation to other portions of the machine as will be hereinafter described.

From the foregoing, it will be clear that each time that the embossing dies 35 and 40 come together they will emboss in the two-layer web the representation of a leaf, as indicated at 46a in Figs. 3 and 4, between them, not only accurately defining the outline of the leaf, but its irregularities, veins and other structural characteristics as well. It will be noted that immediately before the layered web is fed between these embossing dies, it is curved substantially as shown in Fig. 1a, whereas after each leaf representation 46a is moved beyond the embossing dies, each of said leaf representations is transversely shaped as indicated in Fig. 5a, thus simulating the curvature of a natural leaf.

The means for intermittently feeding the web are shown at 46 and 47 whereat it will be noted that said means consist of upper and lower fingers (the lower finger operating in a recess 47a), which fingers are actuated to grip the web 3a, which is moved by these fingers in a direction away from the embossing dies for a predetermined distance (Fig. 6, arrow A), and are then released and moved backwardly to the point of next engagement (Figs. 7 and 5). The means for opening, closing and bodily moving the gripping fingers 46, 47 are omitted for clarity sake, but the operation of such feeding means is clearly indicated in Figs. 5, 6 and 7. In Fig. 5 the die members 35, 40 are shown as embossing a leaf between them and the fingers 46 and 47 are still disengaged from the web and are moving in the direction of the arrow B. According to Fig. 6, the embossing operation has been performed, the upper embossing die 40 is in an elevated or raised position, whereas the feeding fingers 46 and 47 have engaged the web 3a (rearwardly of 2a) and are moving it forward (arrow A) toward the cutting mechanism about to be described, and beneath which an embossed leaf representation is being placed to be cut from the prepared web.

In Fig. 7, the cutting operation is being performed; the upper embossing die 40 is descending (arrow D), and the feeding fingers 46 and 47 are opened to release the web 3a and are starting back toward the embossing dies as indicated by the arrow C.

It is to be noted that each time that the feeding fingers 46 and 47 engage the web 3a, such engagement occurs behind one of the wires 21a, as indicated in Fig. 6, so that the wire thus forms an abutment for the fingers 46 and 47 and insures a positive engagement of the pointed ends of the fingers with the web and results in an accurate feed of the web and positive registration of the embossed leaf representations with the cutting knife.

The cutting knife includes a vertical shaft 48a on which is attached the head 48 in which is mounted a pair of curved and serrated cutting blades 49, 50, the shape of which being clearly seen in Fig. 3.

These blades 49 and 50 are so arranged in respect to one another that they cut the web 3a transversely as indicated at 51, 52, in Fig. 4, thus cutting out a section 53 of the web 3a between each pair of leaves, this section being waste material and being ejected by one or more blow pipes 54 situated adjacent the cutting knife (Fig. 2). It will thus be seen that each time the cutting knife descends it will cut out one side of one leaf and a side of the adjacent leaf, this being clear from Figs. 3 and 4 of the drawings.

Situated between the cutting blades 49 and 50, are rubber or other compressible pads 55, 56 and 57, these pads preventing the knife parts from adhering to the web. It will be observed in Figs. 5 and 6 that these rubber pads normally project below the cutting edges of the blades 49 and 50 and thus, upon the descent of the knife, they first contact with the web 3a and hold it down firmly against a base plate 58 located in a recess 60 in machine base 37 and backed by a foundation of rubber or other compressible material 59, the latter providing a cushioning action which prevents dulling of the cutting blades 49 and 50, equalizes pressure on the cutting edges of the blades and results in a cleaner cutting operation.

As the descent of the cutting knife continues, the blades produce the two cuts 51 and 52. This cutting operation frees the central portion 53 of the web between each two adjacent leaves, such freeing action being facilitated due to the fact that the embossing of the leaf representations in the web results in the placement of a slight transverse stress in each leaf representation, and the cutting relieves this stress, this serving to free the waste material 53 which, upon the raising of the cutting knife, can be blown away by the air blast from the blow pipe 54.

In order to allow the feeding fingers 46 and 47 to separate and free the web, while the cutting knife is in its lowered position, the base plate 58 is recessed at 61 while the head 48 of the cutting knife is recessed as at 62, these recesses allowing clearance for the fingers 46 and 47.

When each leaf is completely cut from the web (one of the cut-out leaves being shown at 63 in Fig. 4), it is engaged by a suction picker 65, is lifted thereby from the base plate 58 and then moved and carried to the right, as seen in Fig. 6, to a position over a suitable receptacle 66, into which it is deposited in a stack and on top of the previously deposited leaves. It will be observed that the head 48 of the cutting knife is recessed at 67 to provide clearance for said suction picket 65.

From the foregoing, the operation of the improved apparatus and the method of making artificial leaves and similar decorative articles will be readily understood.

As exemplified (although a single strip or tape may also be employed which will be bent, twisted or folded) the two strips 2 and 12 to be united into a laminated base or web 3a, are drawn from the rollers 1 and 11 and then intermittently fed between rollers 18 and 29. According to the specific widths of said strips employed, two or more spaced rollers 29 may be arranged, as will be well understood.

Between strips 2 and 12 and before they will be adhesively united, wire pieces are inserted between said strips 2 and 12 and the two strips are then pressed together to from the base material or web carrying as stems said wire pieces, with portions of said wires projecting beyond one longitudinal edge of the web. The action of the feeding fingers 46 and 47 draws the laminated web 3a between the embossing dies 35 and 40, which are adapted to shape embossed leaf representations in said web, such representations being formed about each wire piece so as to cause the latter to constitute the spine and extending stem of a respective leaf. The embossed leaf representations on said web are then moved and successively fed to the cutting blades which, upon their descent, sever a waste section 53 from said web which section is positioned between each pair of leaves, freeing always the last or end leaf 63 from the web, which end leaf is then picked up by suction means, rasied and carried to a position above a collection receptacle into which it is dropped.

It is to be noted that during the embossing operation the web is given a slight contraction toward the respective stem by reason of the embossing which results in freeing the waste section of the web, so that when the cutting head rises higher, the waste section is entirely clear of the web.

The action of the machine is continuous, the various mechanisms thereof being intermittently operated and synchronized, as will be readily understood.

It seems not to be necessary for a clear understanding of this invention, to describe gearing and driving parts of the machine in detail, the machine being rather disclosed schematically in order to explain the production of the decorative article here under consideration. It is obvious, that harmonious working conditions of the machine cause the articles to be rapidly and uniformly delivered by the machine. The spaced flexible elements in form of wires 21a being firmly anchored in the leaf or base material are securely affixed in place and have projecting ends enabling them to be attached to one another or bunched or otherwise decoratively employed in the manner known in the art.

It can thus be seen that there have been provided a method and machine for producing decorative articles, such as artificial flower leaves, comprising means forming a laminated base material with spaced wires interposed between adjacent laminae and projecting beyond said base material, and means cutting said leaf represen-

Having thus described the invention, what is claimed as new and desired to be secured by Letters Patent, is:

1. The method of producing laminated articles in the form of leaves with stems comprising feeding intermittently like lengths of two superposed tapes in spaced relation to each other, coating at least one of said tapes with bonding means, successively introducing from one side in transverse direction to the edges of and during intervals of rest of said tapes between the latter substantially rigid, stem-forming elements each to the extent short of the edges of said tapes positioned opposite said one side thereof, thereafter bonding said superposed tapes to each other and with each stem-forming element disposed therebetween, to thereby form a continuous and elongated laminated web with transverse stem-forming elements therein in spaced apart relation to each other, and then subjecting said web adjacent said stem-forming elements to embossing and die cutting operations, successively.

2. The method of producing laminated articles in the form of leaves with stems which consists in intermittently feeding like lengths of two tapes in spaced and superposed relation to each other, applying to at least one of said tapes bonding means, successively introducing in transverse direction to and during intervals of rest between said tapes substantially rigid, stem-forming elements each element to the extent that it reaches from one side of said tapes to a location short of the opposite side thereof, thereafter bonding said superposed tapes and the respective stem-forming element therebetween, to thereby form a continuous and elongated laminated web with transverse stem-forming elements therein arranged in spaced apart relation to each other, causing said web to form a pendent loop, then subjecting sections of said web adjacent each stem-forming element to embossing operation to thereby convexly shape said web sections, and finally submitting said convexly-shaped web sections to die cutting operation.

3. The method of producing laminated articles in the form of leaves with stems which consists in intermittently feeding like lengths of two tapes in spaced and superposed relation to each other, applying to at least one of said tapes bonding means, successively introducing in transverse direction to and during intervals of rest of said tapes therebetween substantially rigid, stem-forming elements each element to the extent that it projects from adjacent side edges of said tapes to side edges thereof positioned opposite said first named side edges thereof, thereafter compressing and bonding said superposed tapes to each other and with each stem-forming element therebetween, to thereby form a continuous and elongated laminated web with transverse stem-forming elements therein arranged in spaced apart relation to each other, causing said web to form a pendent loop, then subjecting sections of said web adjacent said stem-forming elements to embossing operations to thereby impart convex shape to said web sections, and finally moving said web by intermittently engaging the latter at each stem-forming portion between adjacent web sections to advance said web a predetermined distance.

4. The method of producing laminated articles in the form of leaves with stems which consists in intermittently feeding like lengths of two tapes in spaced and superposed relation to each other, applying to at least one of said tapes bonding means, successively introducing in transverse direction to and during intervals of rest of said tapes therebetween substantially rigid, stem-forming elements each element to the extent that it projects from adjacent side edges of said tapes to side edges thereof positioned opposite said first named side edges thereof, thereafter compressing and bonding said superposed tapes to each other and with each stem-forming element therebetween, to thereby form a continuous and elongated laminated web with transverse stem-forming elements therein arranged in spaced apart relation to each other, causing said web to form a pendent loop, then subjecting sections of said web adjacent said stem-forming elements to embossing operations to thereby impart convex shape to said web sections, moving said web by intermittently engaging the latter at each stem-forming portion between adjacent web sections to advance said web a predetermined distance, and finally stamping out adjacent web sections between two adjacent stem-forming elements.

5. In the method of producing laminated articles in the form of leaves with stems, the steps of introducing at predetermined intervals between two endless and flexible tapes and transversely thereof substantially rigid stem-forming elements, bonding said tapes together with said elements disposed therebetween in spaced relation to each other, to thereby form a continuous and elongated web carrying said transverse stem-forming elements, causing said web to provide a pendent loop, and intermittently engaging said web at positions thereof at which said stem-forming elements are located, to thereby advance said web to die cutting operation.

6. A machine for producing laminated articles in the form of leaves with stems comprising means for feeding intermittently a pair of elongated and spaced apart tapes in lengthwise direction thereof and in superposed relation to each other, means feeding predetermined length of wire pieces between said tapes and angularly thereto while said tapes rmain spaced from each other, pressure exerting means for joining together said tapes with said introduced wire pieces therebetween to form a web carrying angularly thereto said wire pieces, embossing means for convexly shaping joined tape sections upon opposite sides of each stem-forming wire piece, said pressure means and said embossing means being arranged a distance from each other to therby permit said web to assume the shape of a pendent loop therebetween, reciprocable fingers arranged for engagement with each stem-forming wire piece between convexly-shaped web sections to advance said web a predetermined distance, means for severing advanced sections of said web as leaves with a wire piece therebetween, and means for driving said tape feeding means, said wire feeding means, said reciprocable fingers, said embossing means and said severing means in timed relation to each other.

7. A machine according to claim 6, wherein said severing means for said advanced sections is shaped and arranged to simultaneously cut contiguous halves of two adjacent web sections positioned between two adjacent stem-forming wire pieces.

ARNOLD WEISSELBERG.

(References on following page)

REFERENCES CITED

The following references are of record in the file of this patent:

UNITED STATES PATENTS

| Number | Name | Date |
|---|---|---|
| 1,394,037 | Mallory | Oct. 18, 1921 |
| 1,942,174 | Kaplan | Jan. 2, 1934 |
| 2,073,320 | Smith | Mar. 9, 1937 |
| 2,285,447 | Lichter | June 9, 1942 |
| 2,306,835 | Tucker et al. | Dec. 29, 1942 |

FOREIGN PATENTS

| Number | Country | Date |
|---|---|---|
| 25,749 | Great Britain | 1909 |